United States Patent [19]

Müller

[11] Patent Number: 4,833,764
[45] Date of Patent: May 30, 1989

[54] MACHINE TOOL FOR MACHINING WORKPIECES BY MEANS OF ROTARY TOOLS

[75] Inventor: Hans Müller, Albstadt, Fed. Rep. of Germany

[73] Assignee: Gühring Automation GmbH & Co., Frohnstetten, Fed. Rep. of Germany

[21] Appl. No.: 238,846

[22] Filed: Aug. 31, 1988

[30] Foreign Application Priority Data

Sep. 1, 1987 [DE] Fed. Rep. of Germany ....... 3729162

[51] Int. Cl.⁴ ............................................. B23B 39/20
[52] U.S. Cl. ........................................... 29/40; 29/55; 51/165.71; 408/35; 409/203
[58] Field of Search ................... 29/39, 40, 50, 53, 55, 29/564, 36, 565, 41; 409/203, 211, 213, 235; 51/165.71, 3; 408/35

[56] References Cited

U.S. PATENT DOCUMENTS

| | | | |
|---|---|---|---|
| 3,570,369 | 3/1971 | Hoddinoti | 29/39 X |
| 3,760,472 | 9/1973 | Kielma et al. | 29/40 |
| 4,051,583 | 10/1977 | Kato et al. | 29/40 |
| 4,115,956 | 9/1978 | Huffman | 51/165.71 X |
| 4,461,121 | 7/1984 | Motzer et al. | 51/165.71 X |
| 4,550,532 | 11/1985 | Fletcher et al. | 364/474 X |
| 4,597,144 | 7/1986 | Frank et al. | 29/40 |
| 4,738,572 | 4/1988 | Kitamura | 409/211 |

FOREIGN PATENT DOCUMENTS 2753386 5/1979 Fed. Rep. of Germany .......... 29/40
186540 10/1983 Japan ..................................... 29/568
990471 1/1983 U.S.S.R. .............................. 409/235

Primary Examiner—William Briggs
Attorney, Agent, or Firm—Burns, Doane, Swecker & Mathis

[57] ABSTRACT

A program-controlled machine tool is described, for machining workpieces by means of rotary tools which can be brought into engagement with a workpiece under timewise control. The workpiece is disposed on a cross table which rests on a program-controlled rotatable workpiece table which in turn is guided along a first main axis. The tool support region has a vertical support post which bears on its top a translational carriage which is vertically adjustable and is movable in a direction perpendicular to the vertical. Such carriage further bears tool mounts. The mounts comprise a common revolving head the rotational axis of which coincides with the vertical movement axis of the said translational carriage. The revolving head has at least two program-controlled rotatable tool tables the rotational axes of which perpendicularly intersect the rotational axis of the revolving head in a single point. The rotatable tool tables are also program-controlled and bear holding members for various working units, e.g. working spindle means sleeves and/or auxiliary working assemblies, each of which working units is adjustable along another translational axis which is perpendicular to the rotational axis of the particular rotatable tool table which carries the respective working unit.

21 Claims, 6 Drawing Sheets

MACHINE TOOL FOR MACHINING WORKPIECES BY MEANS OF ROTARY TOOLS

FIELD OF THE INVENTION

The invention relates to a machine tool for machining workpieces by means of rotary tools, e.g. grinding or milling tools.

BACKGROUND

U.S. Pat. No. 4,115,956 discloses a machine tool which is in the form of a computer-numerically controllable (CNC) grinding machine. All the movement axes of this grinding machine are program-controlled simultaneous axes, in the sense that all of them may be controlled simultaneously to enable automatic fabrication of the workpiece in a programmed sequence.

The machine does enable program-controlled grinding of workpieces of arbitrary geometry. However, it has been found that programming costs for this machine frequently must be excessive in order to be able to carry out the successive machining steps—involving changes in relative position between the grinding wheel and workpiece—with sufficient precision. When machining very complex workpieces, this may render it impossible to use such tools in the NC mode.

An object of the present invention is to devise a machine tool of this general type wherein all of the workpiece surfaces can be fabricated by a program-controlled technique in a single operating cycle, with the economic efficiency of the machining process being increased.

SUMMARY OF THE INVENTION

According to the invention a universally applicable machining center is provided wherein, under timewise control, a plurality of working too assemblies not limited to a specific type can be brought into engagement with the workpiece which is to be machined. The structure of the apparatus is such that the simultaneous movements which must take place along various axes during a machining operation (that is, the "simultaneous axis" movements for control purposes), as well as the movements which must take place along certain axes in setting up for a particular machining or handling operation (that is, the "setting axis" movements for control purposes), are very easily and reliably programmable.

In particular, each of the individual working tool assemblies can be adjusted along a translational axis such that the contact point of its tool with the workpiece can be moved into the axis of a rotatable tool table. For example, the rotatable tool table may be moved about a horizontal axis and the tool assembly may be carried by such tool table for additional translational movement along an axis that perpendicularly intersects the rotational axis of the tool table. Consequently, a movement of the rotatable tool table around its rotational axis does not change the point of contact of the tool with the workpiece. Therefore complex coordinate transformations are unnecessary, and the control of the various operating sequences is greatly simplified.

The costs of manufacturing and providing drive means for a machine tool according to the present invention may be greater than for known apparatuses according to U.S. Pat. No. 4,115,956, but it has been found that these one-time added costs are greatly outweighed by the cost savings attributable to easier programming of the machine. Moreover, there is an added advantage in that a machine tool according to the invention enables not only grinding operations but also other machining operations, e.g. cutting, machining with defined cuts (drilling, milling, etc.), laser machining, and the like, so that any necessary changing or repositioning of the workpiece can be carried out, as well as taking of measurements between tool engagements, etc. In this way, a workpiece of almost infinitely variable and complex shape can be machined from blank to finished product under continuous programmed control without the need to change the machine tool. As a result, the overall fabricating accuracy is greatly improved.

A revolving head with holding members of preferably identical shape, for holding the various working units, provides for extremely high accuracy of positioning of the tools and assemblies which are to be brought sequentially into engagement with the workpiece.

The structure of the machine tool according to the present invention of course permits the use of customary tool-changing systems, to enable refitting the working assemblies which are not currently engaging the workpiece. The connecting points at which the tools (or assemblies) are changed can be set up in different regions, based on the sequence of operations for the given production. It is particularly advantageous to provide the connecting point between the holding member and the rotatable tool table. In this way, while a workpiece is being machined, additional working units can be assembled away from the machining center, and can be prepared such that the desired positioning is achieved in the shortest possible time after they are coupled to a rotatable tool table.

It has been found that the programming of the machining center can be simplified to a high degree. As a result of the fact that the given point of contact of the working unit with the workpiece can be brought into the rotational axis of the rotatable tool table, the point of intersection between the rotational axis of the rotatable tool table is an ideal initial null point for the programming of the machine. Not only are the resulting program steps simpler but those steps can be directly converted into simple movements of the tool or working assembly via the degrees of freedom of movement of the machining modules provided by the invention. Contributing to these advantages is the increase in the number of program-controlled axes above the number employed in the prior art, so that, for a given program step, the corresponding most favorable program-controlled simultaneous axis can be selected.

It is another feature of the invention that a tool carried by a rotatable tool table is itself movable in translation under program control. With this feature, even more flexibility is provided in employing the machining center. For example, it is possible to perform drilling with the drilled hole having any orientation with respect to the workpiece. When the tool also is rotatable under program control, it is possible, using a single machine tool, to carry out drilling followed by tapping.

If the machining center is equipped with a device for automatic changing of the working units, it is advantageous if the holding members of the working units are chosen such that the points of contact of these working units with the workpiece can be moved to the above mentioned intersection point of the rotational axes of the rotatable tables.

Also, the clamping device for the workpiece may be provided with at least one additional program controlled degree of freedom of movement to allow bodies of even more complex shape to be fabricated. The additional program-controlled degree of freedom may be provided by a simultaneous axis or a setting axis. Preferably, the additional degree of freedom for orienting the workpiece-clamping device is such as to result in further simplification of the program sequence for machining functional surfaces on the workpiece. If, e.g., the plane of the machining for the workpiece contains a program-controlled machine axis, for certain machining operations the movement control is further simplified, with the programming costs being further reduced and easier to review.

Advantageous modes of equipping the machining center with working units are contemplated by the invention, so that a workpiece can be machined from a blank to a final product at minimum cost. Because as a rule the machine tool is operated such that the point of contact between the tool and workpiece lies on the rotational axis of the rotatable tool table, there is a great deal of flexibility in equipping the revolving head. In particular it has been found that by this constraint on the machining point, the reaction forces, particularly in high speed machining, invariably act within the machine guide structures, so that the principal component of the cutting or machining force is directed toward the axis of the revolving head. This allows the revolving head to have large milling tools mounted to it without threatening the stability of the revolving head. Because the position of the point of contact is as specified above, there is an additional advantage of a favorable direction of flight of the chips and a simplified feed of coolant (the latter being due to the fact that the region to be cooled is quasi-stationary).

Further reductions in the cost of machining a workpiece beginning with a blank and finishing with a final product can be achieved if the machine tool is equipped with a measurement and control device so that a correcting intervention may be applied in accordance with a control signal derived from measurement of the results of the preceding machining step. The correcting engagement by a measuring assembly which follows engagement by a given working tool or assembly enables superimposed errors to be eliminated as early as possible, thereby enabling the overall precision of the machining to be increased.

Basically, there is no limit to the number of arms which may be present on the revolving head. This number will be determined mainly by the chief application of the machining center. Highly complex component parts requiring a number of machining operations and thus the use of a number of different tools are preferably fabricated with the use of a revolving head having three arms, and an automatic changing device for the working units is advantageously employed therewith. Fairly large workpieces in serial production are advantageously machined with a four-armed revolving head. In this case, it is not necessary as a rule to multiply the number of working units employed by changing the working units on a single arm.

An indexing device for the revolving head enables safer absorption of the forces acting on the revolving head without sacrifices in positioning accuracy. The programmed control for the setting axis of the revolving head is preferably matched to the indexing device such that when the indexing device enters the "lock" state, a reset state of the programmed control is reached.

Additional advantageous embodiments and refinements of the invention are possible and will be evident to persons skilled in the art from the following description and from the appended claims.

BRIEF DESCRIPTION OF THE DRAWINGS

Exemplary embodiments of the invention will be described in detail below, with reference to the schematic drawings in which.

DETAILED DESCRIPTION OF PREFERRED EMBODIMENTS

Figure 1:
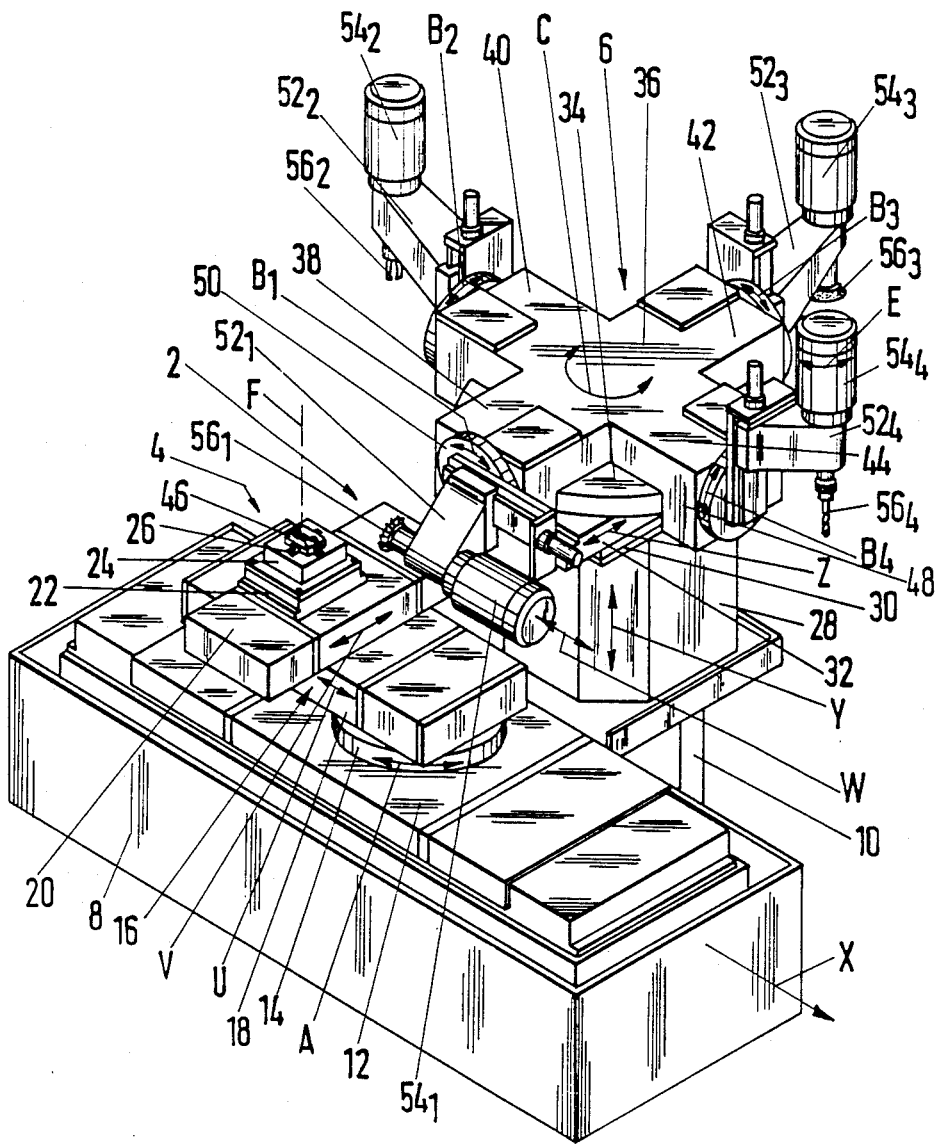
FIG. 1 is a perspective view of the machine tool.

In FIG. 1 there is shown, in a general representation, a universal machining center for machining workpieces by means of rotary tools, e.g. grinding or milling tools. This universal machining center is in the form of a CNC machine tool having a plurality of program-controlled simultaneous axes and/or setting axes.

The machine tool has a workpiece region 4 and a tool support region 6. A machine bed 8 for the workpiece region 4 and a machine bed 10 for the tool support region are rigidly interconnected to form a unit.

Bed 8 for workpiece region 4 bears a first translational carriage 12, movable in a horizontal plane along a first main axis X. A rotatable workpiece table 14 rests on the first translational carriage and is rotatable, as indicated at A, about a vertical axis. For convenience of description, this axis will be referred to as axis A. The table 14 in turn supports a cross table 16 having a longitudinal carriage 18 movable in a direction U and a transverse carriage 20 movable in a direction V.

A workpiece mount 22 comprising a gripping or clamping device is attached to the cross table 16. In the embodiment illustrated in FIG. 1, the workpiece mount bears a gripping or clamping device 24 adjustable around a vertical axis F which provides an additional program-controlled degree of freedom. The axis F may be in the form of a program-controlled setting axis or a program-controlled simultaneous axis. The clamping jaws 26 hold a workpiece 46, which, in the illustration, is in the form of a clipping punch.

Figure 6:
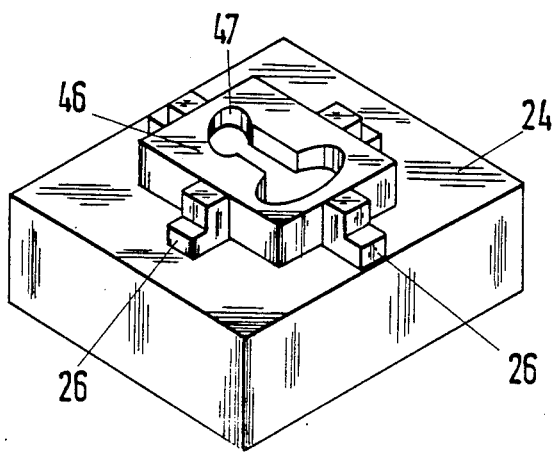
FIG. 6 is an enlarged perspective view of the workpiece mount according to FIG. 1.

The gripping or clamping device 24, shown in isolation in FIG. 6, is preferably replaceably affixed to the workpiece mount in order to enable machining and fabrication of the maximum variety of workpieces. The workpiece 46 to be fabricated in the machining center 2 is seen more clearly in FIG. 6. It comprises a block into which undercut surfaces 47 can be produced without changing the mounting of the workpiece, by means of a program-controlled process beginning with rough machining and concluding with fine machining.

The tool support region 6 has a vertical support post 28 which rests on machine bed 10 and is disposed at a horizontal distance from the rotatable workpiece table 14. The upper end of post 28 forms or has fixed thereon a guide structure 30 for a second main translational carriage 32. The guide 30 is movable along a second vertical main axis Y by means of a drive mechanism (not shown). The carriage 32 itself has a degree of freedom over the guide 30 along a third main movement axis Z perpendicular to the first and second main axes X and Y.

The second main translational carriage 32 bears on its upper side a table 34 for rotatably mounting a revolving head 36 having a vertical axis of rotation C. This axis C is a program-controlled setting axis, to bring the individual ones of the arms 38, 40, 42 and 44 into a working position associated with the workpiece 46 under timewise control.

Each arm of the revolving head bears a rotatable tool table 50 the axis of rotation of which (B1, B2, B3, B4) perpendicularly intersects the vertical axis of rotation C of the revolving head 36. The embodiment of the revolving head 36 illustrated in FIG. 1 has four such rotatable tool tables 50. Their respective axes of rotation (B1, B2, B3, B4) intersect the vertical rotational axis C in a single point.

Preferably, each rotatable tool table in turn bears a removable holding member for a working unit which may be, e.g., a working spindle sleeve (housing) and/or a working assembly such for example as apparatus for measuring, work manipulation devices, or the like. The several removable holding members are designated in the drawings by the reference characters $52_1$, $52_2$, $52_3$ and $52_4$. Similarly, the illustrated tool working units are designated by $54_1$, $54_2$, $54_3$ and $54_4$.

In the embodiment illustrated in FIG. 1 the working units are all comprised of working spindle sleeves ($54_1$ to $54_4$), bearing respectively a milling tool $56_1$, a measuring sensor $56_2$, a grinding wheel $56_3$, and a drill bit $56_4$. The tools on the various working units are chosen and configured such that different machining operations can be carried out on the workpiece 46. The grinding wheel $56_3$ may be, e.g., a grinding wheel with a quasi-variable-shape profile, comprising a metallic support body bearing a CBN (cubic boron nitride) coating.

The various holding members ($52_1$ to $52_4$) of the working units ($54_1$ to $54_4$) of FIG. 1 are shown separately in FIGS. 4A to 4D. It is seen that the holding members ($52_1$ to $52_4$) have identical structures, and are mounted on respective setting guide members ($53_1$ to $53_4$). The device for moving the holding members ($52_1$ to $52_4$) along the guide members ($53_1$ to $53_4$) is a respective setting spindle ($58_1$ to $58_4$).

A common feature of all the working units, whether those units be working spindle sleeves or auxiliary working assemblies (examples of the latter being measuring devices, hand manipulating devices, laser fabricating devices, etc.) is that each is adjustable in the respective holding member 52 via it's guide member 53 along a fourth translational axis W which perpendicularly intersects the respective axis of rotation B of the associated rotatable tool table 50. The translational axis W may be in the form of a pure adjusting axis, or a program-controlled setting axis or program-controlled simultaneous axis, enabling, e.g., drilling operations to be carried out with the working spindle associated with the sleeve or housing $54_4$.

It is further possible to provide an additional program-controlled rotational axis E in the area of one or more working spindle sleeves, as indicated with respect to the area of spindle sleeve $54_4$ in the embodiment according to FIG. 1. This axis E can function as a setting axis or simultaneous axis. In the latter case it is also possible to carry out internal thread cutting (tapping) operations on the workpiece by means of the working unit.

The above-described structure of the machine tool with the linear main axes X, Y and Z, the rotational axes A to C, and the additional linear movement axes U, V and W, all of which are program-controlled, opens up the possibility of program-controlled machining of workpieces of arbitrary shape without remounting of workpieces, starting from a blank and ending with a finished end product. The number of program-controlled simultaneous axes and the spatial arrangement of these axes make feasible a basic simplification of the programming. This will be discussed in more detail below, with reference to FIGS. 2 and 3.

Figure 2:
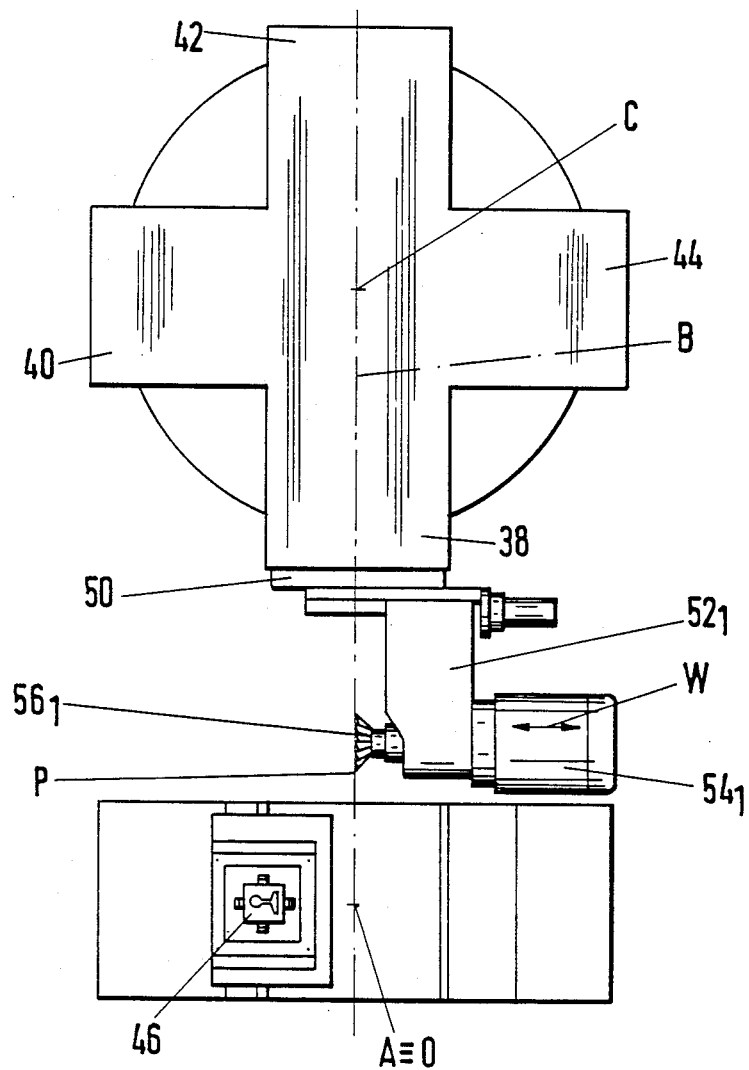
FIG. 2 is a plan view of the machine tool of FIG. 1, with only on working unit shown for simplicity.
Figure 3:
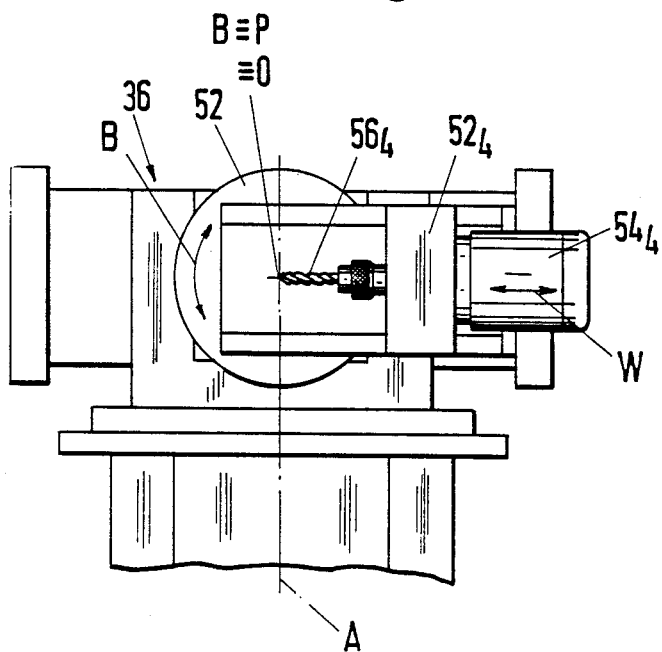
FIG. 3 shows a front view of the next working unit after the revolving head has been advanced a subsequent step from the position in FIG. 2, with the direction of view being along the rotational axis of the associated rotatable table for the tool.

In FIGS. 2 and 3 the revolving head 36 is illustrated in simplified fashion, with only the currently operative tool being shown. FIG. 2 shows the revolving head 36 in the position according to FIG. 1. In FIG. 3 the revolving head has been rotated clockwise by 90°.

It is a feature of the present invention that the existence and disposition of the translational axis W allows the tool (e.g., the milling tool $56_1$) to be positioned such that its point of contact P with the workpiece is movable into the rotational axis B of the rotatable tool table 50 and into the vertical rotational axis A of the rotatable workpiece table 14. This is facilitated by the fact that the second main translational carriage 32 is movable on the support post 28, so that sufficient free space to the cross table remains to enable the point P of the milling tool $56_1$ to be moved translationally into the axis A.

It has been found in practice that the programming of the machine can be substantially simplified, and in addition the operating accuracy can be improved, if the programming of the individual drive direction associated with the above-described axes is based on a so-called "program null point", 0, which represents the point of intersection of the axes A and B and in addition the point of contact with the workpiece P of the suitably adjusted tool. The special advantage lies in the fact that the contact point P of the milling tool $56_1$ with the workpiece is not changed as the working unit 54 is moved around the rotational axis B. This eliminates the need for complex (and quite costly to program) program steps to accomplish the precise positioning of the contact point P relative to the other axes. Furthermore, the working assembly to be used next (after the current one) can be programmed with the identical starting point of reference with respect to the workpiece, thereby improving operating accuracy.

This relationship may be appreciated from FIG. 3, which shows the revolving head 36 in a position rotated clockwise by 90° with respect to its position in FIG. 2. As a consequence of the additional degree of freedom provided along the fourth translational axis W, the point of contact P of the tool (e.g., the drill bit $56_4$) with the workpiece may be brought to coincide with the intersection point of the axes B and A, so that the same null point can serve for the programming of the drill bit $56_4$ as was employed for the earlier milling tool $56_1$. The great advantage in this is that there is no need for complex coordinate transformations in the event of swinging movement of the working assembly $54_4$ around the axis B.

In consequence of the same initial reference point with respect to the workpiece being provided in the cases of the separate sequentially applied working assemblies, as the initial point for the programming, the operating accuracy is also improved. This provides the necessary basis for employing on the revolving head working units in the form of measuring stations ($54_2$) and/or hand manipulating devices, thereby opening up the possibility, via feedback between the measuring station and working unit, of intervening correctively in the machining process. Machining of the workpiece 46 may continue in a programming loop until it has been automatically confirmed that the desired tolerance level has been attained. The operating accuracy is further improved by the fact that, as a result of the increased number of program-controlled simultaneous axes, the most favorable axes may be chosen in a given machining process from the several movement axes. The chosen axes will be that combination which allows control with the fewest axes requiring mutual coordination.

Figure 4A:
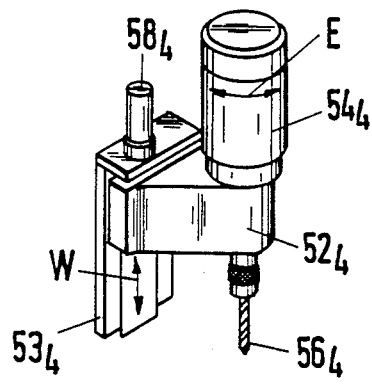
FIGS. 4A–4D are perspective views of the working units shown in FIG. 1.
Figure 4B:
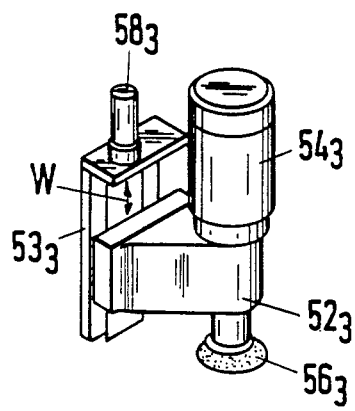
Figure 4C:
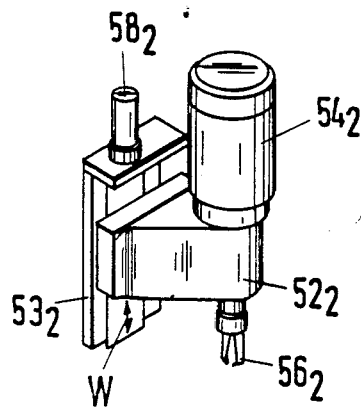
Figure 4D:
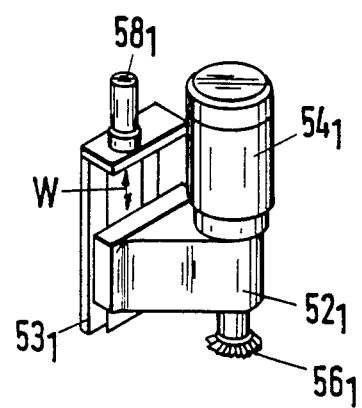

The measuring station $54_2$ according to FIG. 4C has measuring calipers or the like $56_2$ which are moved against the workpiece 46 to check the dimensions either between the individual machining steps or after the conclusion of the entire sequence of machining steps. The contact point of the calipers $56_2$ with the desired final machined workpiece surface is used as the basis of the programming of the measuring system. This is converted to the null point (as mentioned above) for programming the movement of the calipers.

The above-described structure of the machine tool not only facilitates the programming of the machining steps (thereby contributing to increased economy of the machining process), but it also establishes the necessary pre-conditions for the use of high performance tools, e.g. milling tools and high speed grinding tools, the use of which requires the machine tool to sustain high forces. The important feature here is that the main cutting forces, i.e., machining forces, are absorbed in the machine guide means, and furthermore are directed such that the largest force components point toward the axis of the revolving head. Accordingly, the machine tool is suitable as a universally applicable machining center for workpieces of arbitrary shape and size. Thus, e.g., it is possible to manufacture sunk shapes (e.g., counter sunk, counterbore, etc.), cutting tools, and even turbine blades with a single mounting of the workpiece. The highly favorable transmission of cutting forces also ensures that the greater number of degrees of freedom (compared with ordinary machine tools) will not be detrimental to positioning accuracy. Additional movement axes can be provided for the workpiece mounting, and these may also function as program-controlled setting axes or simultaneous axes.

Figure 5:
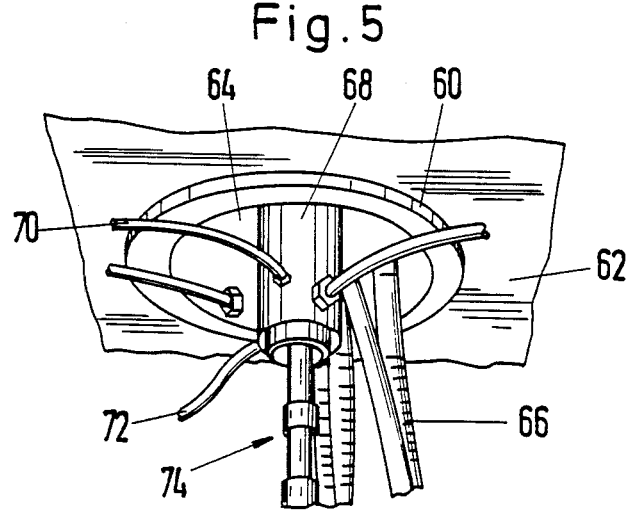
FIG. 5 is a perspective detail view of an energy supply facility disposed above the revolving head.

Obviously, the several working units of the machine tool require a correspondingly complex supply system, i.e. supply lines for the hydraulics and the electrical devices. For this purpose, a central energy supply facility is provided above the revolving head 36. Details of this are illustrated in FIG. 5. A support ring 60 is affixed to the housing 62 (only a small part of which is shown) of the machining center. A sliding disc or dish 64 abuts the ring 60, which disc or dish 64 provides, on its upper side, the connection to a cable conduit (not shown). The support disc has openings for the electrical control lines 66, and on the middle of its underside it has a projection 68 of the housing which projection serves as a distribution manifold for the hydraulic supply lines 70. In addition, radial support arms are provided which serve for guiding the supply lines (66, 70) to the individual working units.

The support disc 64 along with the housing projection 68 is coupled to the revolving head 36 with regard to the drive of said head. For this purpose a telescopic shaft connection 74 is provided which includes a universal joint (not shown) in order to coordinate movement of the support disc 64 with the head 36 regardless of the position of the second main translational carriage 32. This type of energy supply configuration advantageously opens up the possibility of using the rotational movement of the support disc 64 as a control basis for a hydraulic multi-way valve for the hydraulic control lines. In this way, the rotational movement of the revolving head 36, for example, can be used to provide that only the hydraulic supply line 70 which is associated with the head arm is currently directed toward the workpiece is controlled at any given time.

The revolving head is advantageously moved in steps (of 90°, with the embodiment shown which has four working units) such that the stepwise movement proceeds in one direction to the extent of up to 270°, whereafter the head is swung by more than 270° in the opposite direction, to bring the remaining working unit(s) into engagement with the workpiece. In this way, one can eliminate the use of sliding contacts, which can be the sources of problems in CNC control systems.

In order to provide maximum positioning accuracy for each working assembly which is to be brought into position in succession over the workpiece, it is advantageous if the revolving head 36 also has associated with it an indexing device (not shown). This provides the further advantage that the setting drive for the revolving head can be designed without regard to the maximum cutting forces (machining forces) which will occur.

Figure 7:
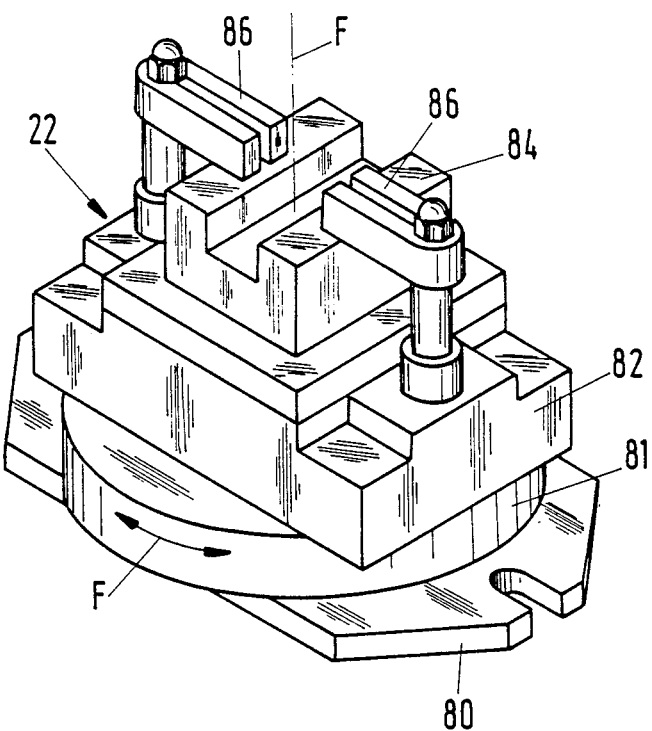
FIG. 7 is a perspective view of a second variant of the workpiece mount.

A second variant of a workpiece mount 22 is shown in FIG. 7. The mount can be releasably attached to the cross table 16, via a base plate 80. A clamping block 82 rests on plate 80 via the intermediary of a rotatable table 81 having an axis of rotation F. The clamping device proper is formed by a clamping shoe mechanism 86. Just as may optionally be provided in connection with the workpiece mount according to FIGS. 1 and 6, for the exemplary embodiment according to FIG. 7 the rotational axis F can be employed as an additional program-controlled degree of freedom. Obviously, this degree of freedom may optionally have a different spatial orientation. In any event, its orientation should be such that it can be brought into parallel orientation with one of the main axes (X, Y, Z).

Figure 8:
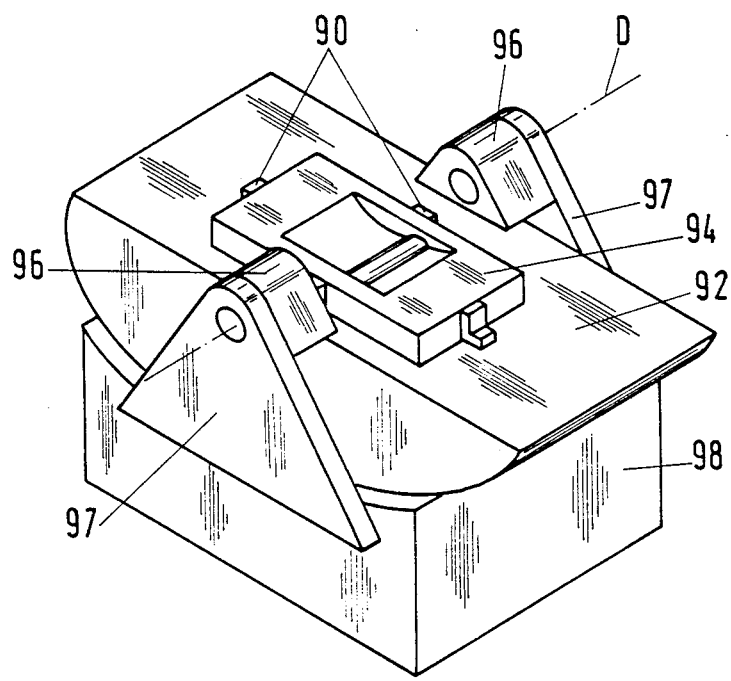
FIG. 8 is a perspective view of a third variant of the workpiece mount.

A third variant of a workpiece mount is shown in FIG. 8. The workpiece 94, shown here in the form of a block of material from which a sunken or relief structure is to be machined, is held on a clamping block 92 by a clamping jaw arrangement 90. On both sides of the jaw arrangement the block 92 has bearing blocks 96 for a pivot axis D. The pivot is held fixed in bearing plates 97, which are in turn affixed to a holding block 98. The axis D, which serves as a simple adjusting axis, but may serve as a program-controlled setting axis or program-controlled simultaneous axis. This axis is preferably arranged such that preferably it passes through the middle of the workpiece, e.g. through a main axis of symmetry of the workpiece. The disposition of the holding block 98 on the cross table is selected such that the rotational axis D can be brought parallel to one of the program-controlled machining axes (main axis Z, in the embodiment according to FIG. 8), in order to simplify the programming in the manufacturing of complex operating surfaces, and to enable reduction of the number of tools.

Obviously, the invention is not limited to the concrete exemplary embodiment illustrated in the drawings. Rather, variants and refinements are possible within the scope of the invention. Thus, e.g., it is possible to operate with different tools, e.g. grinding rods, tapping tools, and laser tools. Further, the revolving arm may bear different working units, e.g. insertion and removal devices for workpieces, a device for turning over or inverting the workpiece, or a hand manipulating device. Finally, the holding members ($52_1$ to $52_4$) may bear adapters for the various working assemblies, in order to simplify the mounting of these various devices.

In addition, the revolving head may differ from that of FIGS. 1–3 by having a different number of arms to adapt the machine to the prevalent application. If the frequency of change of the working assemblies becomes very high in fabricating a given workpiece, due to the complexity of the machining, it is advantageous if the number of arms of the revolving head is reduced to three. Then while one of the working assemblies is engaging the workpiece, the two other stations which are not being actively utilized can be the sites of refitting operations. For use of the machining center for large serial production, however, it will generally be advantageous to employ four arms, because it has been found that, if a suitable tool complement is provided, with four arms all the machining processes can be carried out with a single mounting. In this connection, it is advantageous if the arms of the machining center are structurally identical, so that the sequence of engagements by the various working assemblies is in no way limited by structure.

In summary, the invention provides a program-controlled machine tool for machining workpieces by means of rotary tools which can be brought into engagement with a workpiece under timewise control. The workpiece is mounted on a cross table which rests on a program-controlled rotatable workpiece table which in turn is guided along a first main axis. The tool support region has a vertical support post which bears on its top a translational carriage (the second main translational carriage) which is vertically adjustable and is movable in a direction perpendicular to the vertical, which carriage further bears tool mounts.

The mounts comprise common revolving head the rotational axis of which coincides with the vertical movement axis of said second main translational carriage. The revolving head has at least two program-controlled rotatable tool tables the rotational axes of which perpendicularly intersect the rotational axis of the revolving head in a single point. The rotatable tool tables are also program-controlled and bear holding members for various working units each of which is adjustable along a fourth translational axis perpendicular to the rotational axis of the given rotatable tool table. The working units may be working spindles and/or auxiliary working assemblies. The rotational axis of the revolving head is a program-controlled setting axis, so that the individual working units can be brought in sequence into engagement with the workpiece to allow the workpiece to be machined in a single mounting in a sequence of operations, with the given machining center taking it from a blank to the finished product. In this way, a universally applicable machining center is provided which is distinguished by a novel structure, simplified programmability, and high machining precision.

What is claimed is:

1. A machine tool for machining workpieces by means of rotary tools which can be brought into engagement with a workpiece under timewise control; said machine tool having workpiece positioning means and tool positioning means;

said workpiece positioning means including a first translational carriage guided for horizontal movement in a first direction and a rotatable table carried by said first translational carriage and being itself rotatable about a vertical axis of rotation, a cross table for holding the workpiece carried by said rotatable table and being translatable in two mutually perpendicular directions;

said tool positioning means including a support post spaced horizontally from said rotatable table of said workpiece positioning means, a vertically movable second main translational carriage carried by an upper end of said post and being mounted for additional movement in a horizontal direction perpendicular to the horizontal direction of movement of said translational carriage, a revolving head carried by said second main translational carriage and being itself rotatable about a vertical axis, a plurality of rotatable tool tables borne by said revolving head at locations spaced apart from one another about the axis of rotational movement of said revolving head, each of said rotatable tool tables being rotatable about a horizontal axis which intersects the vertical axis of rotation of said revolving head with the horizontal axes of all said tool tables intersecting said revolving head vertical axis at a single point, each of said tool tables bearing tool holding means adjustable along a translational axis perpendicular to the rotational axis of that tool table; and means for providing programmed control, with all the movements of the components being mutually independently controllable and with said axis of rotation of said revolving head being a program controlled setting axis.

2. A machine tool according to claim 1, wherein each of said tool holding means is releasably attached to its rotatable tool table.

3. A machine tool according to claim 1, including a tool working unit mounted to at least some of said tool holding means, and wherein the tool holding means are matched to their respective tool working units so that the respective point of contact of each working unit with a workpiece fixed with respect to said cross table can be brought into the intersection point of the rotational axis of the rotatable workpiece table and the rotational axis of the respective rotatable tool table.

4. A machine tool according to claim 3, wherein each of said translational axes along which a respective one of said tool holding means is movable is a program controlled simultaneous axis.

5. A machine tool according to claim 3, wherein at least one of said tool working units has an additional program-controlled rotational axis which has the same orientation as the translational axis for its respective tool holding means.

6. A machine tool according to claim 1, including means for automatically changing from one tool working unit to another selected tool working unit at a given location on said revolving head, and wherein the work holding means employed to hold the different tool working units are so constructed that the respective points of contact between the working units and the workpiece can be brought into the intersection point of the rotational axis of the rotatable workpiece table and the rotational axis of the respective rotatable tool table.

7. A machine tool according to claim 1, wherein said cross table bears a replaceable clamping device.

8. A machine tool according to claim 7, wherein at least one additional program-controlled degree of freedom is associated with the gripping or clamping device.

9. A machine tool according to claim 8, wherein the workpiece can be accurately aligned with one of the program-controlled machine axes via at least one additional degree freedom of the clamping device for the workpiece.

10. A machine tool according to claim 9, wherein the clamping device additionally has a rotational axis which preferably coincides with a main axis of the workpiece.

11. A machine tool according to claim 1, including a tool working unit carried by each of at least some of said tool holding means, and wherein at least one of said tool working units bears a plurality of axially separated tools, and wherein movement of the tool holding means bearing the last mentioned tool working unit along its translational axis can adjust the respective contact point of such tool with the workpiece.

12. A machine tool according to claim 1, wherein an energy supply facility is provided above said revolving head to supply the said head centrally with energy 13. A machine tool according to claim 1, wherein mounting and de-mounting devices for the workpiece are provided as working units.

14. A machine tool according to claim 1, wherein devices for inverting the workpiece are provided as working units.

15. A machine tool according to claim 1, wherein at least on measuring device is provided as a tool working unit.

16. A machine tool according to claim 1, wherein at least one grinding wheel assembly, particularly a high speed grinding wheel assembly, is provided as a tool working unit.

17. A machine tool according to claim 1, wherein at least one of said tool working units is constituted by apparatus for performing at least one of milling, drilling, thread-cutting, and laser machining.

18. A machine tool according to claim 1, including a measurement and control device whereby a correcting intervention may be applied in accordance with a control signal based on the operating sequence of the preceding machining step.

19. A machine tool according to claim 1, wherein said revolving head has four arms each of which bears a tool holding member carrying a tool working unit.

20. A machine tool according to claim 19, including an indexing device for the revolving head.

21. A machine tool according to claim 1, wherein a grinding wheel trueing device is provided as a tool working unit, and a grinding wheel to be trued is held in a clamping device for workpieces.

* * * * *